(12) United States Patent
Lafage et al.

(10) Patent No.: US 12,511,466 B2
(45) Date of Patent: Dec. 30, 2025

(54) SYSTEM AND METHOD FOR GENERATION OF A REPORT AND DEBUG OF ADDRESS TRANSFORMATIONS IN ELECTRONIC SYSTEMS DESCRIBED WITH IP-XACT STANDARD

(71) Applicant: ARTERIS, INC., Campbell, CA (US)

(72) Inventors: Benoit Lafage, Les Lilas (FR); Insaf Meliane, Asnières-sur-seine (FR); Nabil Guissouma, Paris (FR)

(73) Assignee: ARTERIS, INC., Campbell, CA (US)

( * ) Notice: Subject to any disclaimer, the term of this patent is extended or adjusted under 35 U.S.C. 154(b) by 646 days.

(21) Appl. No.: 17/855,806

(22) Filed: Jul. 1, 2022

(65) Prior Publication Data
US 2023/0025288 A1   Jan. 26, 2023

Related U.S. Application Data

(60) Provisional application No. 63/217,725, filed on Jul. 1, 2021.

(51) Int. Cl.
*G06F 30/398* (2020.01)
*G06F 11/32* (2006.01)
*G06F 30/394* (2020.01)

(52) U.S. Cl.
CPC ......... *G06F 30/398* (2020.01); *G06F 11/321* (2013.01); *G06F 30/394* (2020.01)

(58) Field of Classification Search
CPC .................................................. G06F 30/398
USPC .......................................................... 716/111
See application file for complete search history.

(56) References Cited

U.S. PATENT DOCUMENTS 10,515,176 B1 * 12/2019 Maoz .................... G06F 30/398

\* cited by examiner

*Primary Examiner* — Eric D Lee
(74) *Attorney, Agent, or Firm* — Dana Legal Services; Jubin Dana

(57) ABSTRACT

In accordance with various embodiments and aspects of the invention, systems and methods are disclosed that create a system-level address map and create a report. A system description of an electronic system (e.g., integrated circuit (IC)) is received that includes configuration parameters. A tree representation of the system is created based on the interconnect of the system. Each port of the system is assigned a tree node. To create a corresponding system-level address map, the tree representation is traversed from target(s) to initiator(s), calculating the address transformation at each node. A report of the system-level address map is created, and defects such as address duplication, missing addresses, etc. can be identified and reported to the user.

20 Claims, 8 Drawing Sheets

Path(s) selection:

starts with: Initiator/O
contains:
ends with: TargetA

Selected Path(s)

| Component | Interface | Transformation | Original Address Range | | Computed Address Range | |
|---|---|---|---|---|---|---|
| | | | Start Address | End Address | Start Address | End Address |
| TargetA | I | None | 0x0100 | 0x20ff | 0x0100 | 0x20ff |
| Bridge | O1 | Clipping | 0x0100 | 0x05ff | 0x0100 | 0x05ff |
| Bridge | I | Offset | 0x0100 | 0x05ff | 0x1100 | 0x15ff |
| InitiatorO | O | None | 0x0100 | 0x05ff | 0x1100 | 0x15ff |

SYSTEM AND METHOD FOR GENERATION OF A REPORT AND DEBUG OF ADDRESS TRANSFORMATIONS IN ELECTRONIC SYSTEMS DESCRIBED WITH IP-XACT STANDARD

CROSS REFERENCE TO RELATED APPLICATION

This application claims the benefit of U.S. Provisional Application Ser. No. 63/217,725 filed on Jul. 1, 2021 and titled REPORTING AND DEBUG OF ADDRESS TRANSFORMATIONS IN ELECTRONIC SYSTEMS DESCRIBED WITH IP-XACT STANDARD by Benoit LAFAGE et al., the entire disclosure of which in incorporated herein by reference.

FIELD OF THE TECHNOLOGY

The present technology is in the field of system design and, more specifically, related to synthesis and analysis in a system on chip (SoC).

BACKGROUND

When a system designer is creating modern integrated circuits (ICs), (e.g., System on Chip (Soc)), the process typically involves connecting multiple components (processor core, memory, etc.). When a network on chip (NoC) is used for communication between components, a multitude of addresses must be managed to ensure that all components are accessible and there are no conflicting memory addresses.

Components within a SoC perform various transactions (e.g., read, write, data transfer, etc.). The component that begins a transaction is typically referred to as an initiator and the one or more components that receive the transaction are typically referred to as target(s). A common transaction is to read the memory or register of another component. A transaction may contain one or more destination addresses for the one or more components the transaction is sent to. The address may include the address of a sub-component (e.g., an individual register within an array of registers, internal memory, etc.). The address may be a binary coded integer. Various components within a system may use a different number of bits to encode an address.

Various routing components may be used to route and process transactions between the initiator and target (e.g., interconnects and bridges). For example, an interconnect can have several input ports accepting transactions, determine the output port based on address, and may modify the address. For another example, a bridge may have a single input port and a single output port, perform operations on the transaction (e.g., communication protocol conversions, clock conversions, buffering, etc.), and modify the address to create a new address for the outgoing transaction.

A system designer may connect multiple components to build a system-on-chip (SoC). For example, connect initiator's output port (issuing transactions) to bridges and interconnects input ports, connect bridges and interconnects output ports to other bridges or interconnects input ports, and connecting bridges or interconnects output ports to target input ports. Interconnects may use incoming transaction addresses in one or more of the interconnect input ports to select the output port for the transaction.

Initiators, targets, bridges, and other components may treat addresses differently according to the mode of operation of the system. For example, part of the target address space may not be accessible in low power mode, or by non-secured accesses. For another example, system-level address maps may be remapped to other addresses in certain modes of operation. The collection of memory addresses in a target to which initiators can issue a transaction (e.g., target component, internal memory, internal register, etc.) may be referred to, in general, as a system-level address map.

When a system designer is developing a complex system, the designer will typically face a complex address analysis of the system that include addresses accessible from initiator, unreachable targets, multiple address for the same component (e.g., register aliasing, memory aliasing, etc.), multiple components having the same address (e.g., register overlap, memory overlap, etc.), etc. A system designer needs a detailed address analysis of the system-level address map, which is currently done by hand. This manual process may be time consuming and error prone especially for complex address schemes. Therefore, what is needed is a system and method to create a system-level address map and report the result to a user with the level of details necessary to understand the calculations and debug the reported problems.

SUMMARY

In accordance with various embodiments and aspects of the invention, systems and methods are disclosed that create a system-level address map and report the result to a user with the level of detail necessary to understand the calculations and debug the reported problems. A system description of an electronic system (e.g., integrated circuit (IC)) is received that includes configuration parameters. A tree representation of the system is created based on the interconnect where the initiator is the root node, the targets are child nodes, and each port of the system is a tree node with a data model. To calculate the system-level address map, each target node is evaluated and the transformation contained within the data model is applied as the tree structure is traversed until the initiator node is reached. After calculating the system-level address map, the system-level address map report is created in text and/or graphic format.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
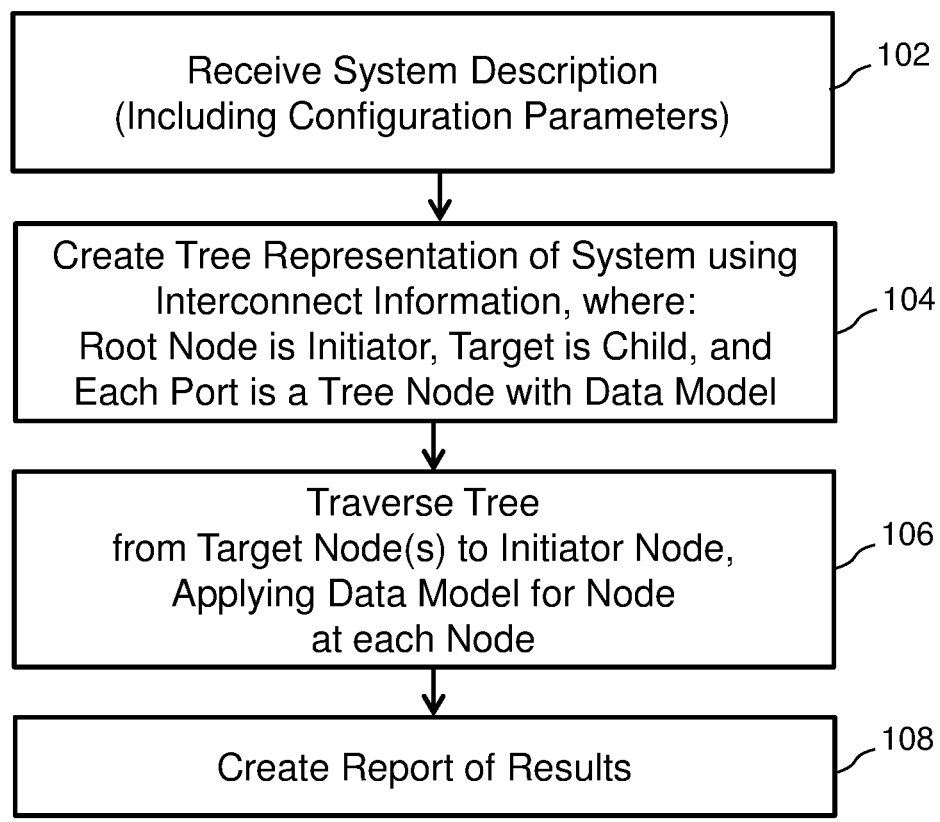
FIG. 1 shows a process of calculating a system-level address map in accordance with the various aspects and embodiments of the invention.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The terms "source," "master," and "initiator" refer to similar intellectual property (IP) modules/blocks or units; these terms are used interchangeably within the scope and embodiments of the invention. As used herein, the terms "sink," "slave," and "target" refer to similar IP modules or units and the terms are used interchangeably within the scope and embodiments of the invention. As used herein, a transaction may be a request transaction or a response transaction. Examples of request transactions include write request and read request.

Various references are made herein to integrated circuits (ICs) and the designs of ICs. One example of an IC is a multiprocessor system that is implemented in systems-on-chip (SoCs) that communicates through networks-on-chip (NoCs). The SoCs include instances of initiator intellectual properties (IPs) and target IPs. Transactions are sent from an initiator to one or more targets using industry-standard protocols. The initiator, connected to the NoC, sends a request transaction to a target or targets, using an address to select the target or targets. The NoC decodes the address and transports the request from the initiator to the target. The target handles the transaction and sends a response transaction, which is transported back by the NoC to the initiator. As such, the SoC and NoC include complexity and configurability, especially in situation when the NoC is configurable.

In accordance with various embodiments and aspects of the invention, a system-level address map description is generated using a software tool during the design process. The tool elaborates the system-level address map from a set of configuration parameters. In accordance with one aspect and embodiment of the invention, the system is configurable to the user/designer needs. If changes are made, then the tool will have to be restarted and re-executed. Accordingly, every time the input configuration changes, the tool may need to restart or the elaboration is re-executed.

As such, there is a risk of giving a completely different solution from one run to the next, even if the changes to the configuration are limited or minor. This is due to the accumulation of transfer functions along the system-level address map tree. During the design time of SoC, the configuration changes and evolves.

According to one or more aspects and embodiments of the invention, calculating a system-level address map identifies the unique memory addresses or unique memory address ranges in the system. An address range may be a contiguous sequence of addresses, with a start address and an end address, from a given initiator, for which transactions using an address in the range go through the same sequence of components and reaches the same target. A system-level address map may be created by looking at address ranges of the initiators in a system. Issuance capabilities may be the number of address bits in a transaction issued by an initiator (e.g., graphics processor unit (GPU), central processing unit (CPU), etc.). Acceptance capabilities may be the number of address bits in the transaction received by a target (e.g., a peripheral component). A transfer function for a bridge may be the transformation a bridge implements on the address field of a transaction before issuing the transaction. An interconnect transfer function may include selection of an output port based on the received transaction, and transformations performed on incoming transaction's address fields before issuing the transactions on the selected output port.

Referring now to FIG. 1, a process is shown for calculating an address map from an initiator to a target in accordance with the various aspects and embodiments of the invention. Combining all the address maps for each pair of initiator and target will result in a system-level address map for the initiator in accordance with the various aspects and embodiments of the invention.

At step 102, a system description including configuration parameters is received. According to one or more aspects and embodiments of the invention, the system description includes the connectivity between system components and configuration parameters including addressing information (e.g., base address, range, offset, transformation, etc.) for each system component.

According to one or more aspects and embodiments of the invention, the system description including configuration parameters may be described by using the IP-XACT standard (e.g., IEEE 1685-2009 IP-XACT). Initiators, targets, bridges, interconnects, and other network components may be modeled as IP-XACT components. Bridges and interconnects may be modeled with IP-XACT bridges or channels that link input and output ports together inside the component. Target internal memories or registers may be modeled with IP-XACT memory maps or local memory maps linked to the target input ports. Memory map sub-components may be defined with base addresses and ranges. A bridge, an interconnect, an initiator, and other network components may contain memory maps addressed by input ports (e.g., IP-XACT memory maps addressed by slave bus interfaces) or output ports (e.g., IP-XACT local memory maps addressed by master bus interfaces). A bridge, an interconnect, an initiator, and other network components may be a target. Addressable ranges may be modeled with IP-XACT address spaces linked to the initiator, bridge, interconnect, or other network components output ports. Addressable ranges may also include offsets, ranges, and segments that can be seen as addressing visibility windows. Ports of instantiated components may be connected with IP-XACT interconnections or hierarchical connections.

At step 104 a tree representation of the system is created using interconnect information where an initiator is the root node, a target is a child node, and each port is a tree node containing a data model. The data model contains information about the node (e.g., hierarchical component identification within the design, local addressable elements, address transfer function, transformations (e.g., masking, clipping, adding offset, etc.), local address ranges, etc.), capability to perform operations on addresses (e.g., address range), memory of node (e.g., memory, registers, etc.). The data model for each node may include issuance capabilities, acceptance capabilities, and one or more transfer functions from input port to output port(s) (e.g., bridge transfer function, interconnect transfer function, component transfer function, etc.). According to one or more aspects and embodiments of the invention, a transfer function includes operation identifier and operation property (e.g., shift, offset, etc.). According to one or more aspects and embodiments of the invention, data model information (e.g., transfer function, issuance capabilities, acceptance capabilities, etc.) uses configuration parameters. Creation of the tree representation will be discussed in further detail in relation to FIG. 3.

At step 106, traversal of the tree is carried out. The traverse begins from the target node(s) in the tree representation, and continues through the tree to the initiator. The address range (e.g., start address to end address) and data model is retrieved for each node. The computed address range may be calculated by processing the data model and address range. For example, the data model can contain an offset function and the offset function is applied to the address range to calculate the calculated address range. The process of reading the address range and data model of the current node and calculating the calculated address range may be repeated throughout the traverse until the initiator node is reached. By traversing from the target(s) (child node(s)) to the initiator (root node) and applying the respective data models at each step, the path of the system-level address map from the initiator to the target(s) is computed. When multiple initiators are present in a design, the process is repeated for each set of targets associated with each initiator. Traversing of the tree representation will be discussed in further detail in relation to FIG. 4.

At step 108, a report is created based on the system-level address map from the targets to the initiator. According to one or more aspects and embodiments of the invention, the system-level address map may be displayed to a user as text (e.g., plain text, table, etc.) and/or graphical (e.g., system level schematic). According to one or more aspects and embodiments of the invention, the report may include errors such as masked addresses (e.g., ranges of address locations in a target that is not accessible by an initiator), unintended overlaps (e.g., a single address from a given Initiator addressing two different target locations), and any other errors in the memory map.

According to one or more aspects and embodiments of the invention, the report may be stored to computer storage and/or kept in computer memory. According to one or more aspects and embodiments of the invention, errors can be displayed as text and/or displayed graphically (e.g., message on a computer screen, pop-up message, etc.). According to one or more aspects and embodiments of the invention, when components and/or sub-components (e.g., memories, registers, etc.) can be accessed by multiple paths (e.g., alias), the multiple paths description is added to the report.

According to one or more aspects and embodiments of the invention, filters may be applied to the report. According to one or more aspects and embodiments of the invention, a graphical display of the system has system-level address map data annotated (e.g., computed address range) at each component. According to one or more aspects and embodiments of the invention, the system is displayed as a schematic and the report may be overlayed on the schematic.

The user may redefine the initiator by selecting a port of a component or a bus in the system to retrieve information about the port and/or dynamically update the report. According to one or more aspects and embodiments of the invention, the report is stored in a computer readable format, and another computer program may perform additional processing on the report and/or the system-level address map.

According to one or more aspects and embodiments of the invention, calculating a system-level address map is carried out for all initiators in a system. According to one or more aspects and embodiments of the invention, a user specifies which initiators to use in calculating the system-level address map. When several initiators are processed together, unmapped target address ranges within the system may be detected and a system resource sharing analysis may be performed. According to one or more aspects and embodiments of the invention, a user may specify filtering criteria (e.g., list of targets of interest, a list of bridges ports that take part in the address transformation, etc.) that are applied to the report.

According to one or more aspects and embodiments of the invention, a system-level address map may be created for each mode of operation. For example, a system may have a normal mode of operation where memory component A and memory component B are accessible, and a low power mode where only memory component A is accessible. In this situation, one address map may be created for normal operation and another address map may be created for low power mode. During different modes of operation, the routing of transactions may be different.

Figure 2:
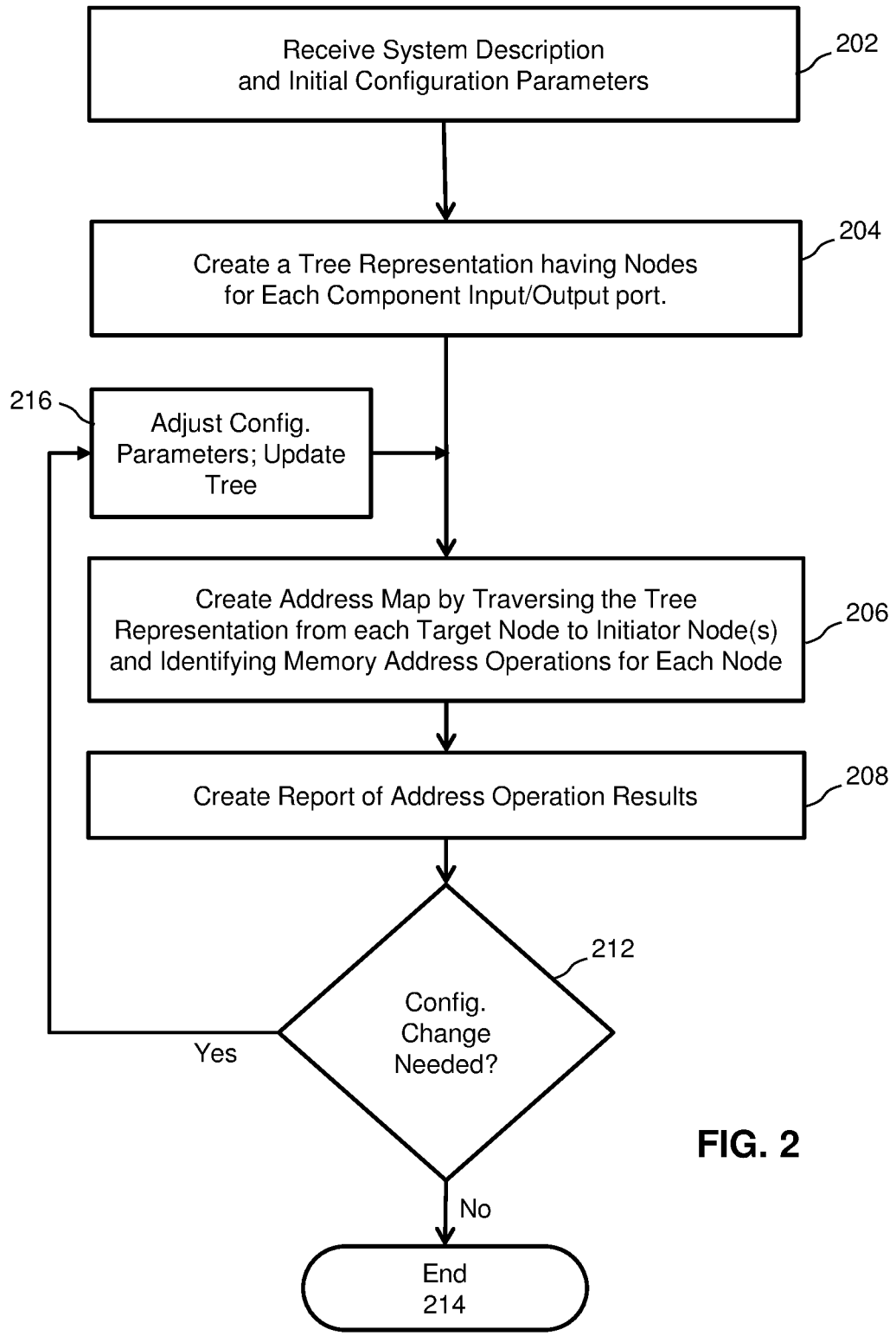
FIG. 2 shows a process of calculating system-level address map with the user interactively changing one or more configuration parameters in accordance with the various aspects and embodiments of the invention.

Referring now to FIG. 2, a process is shown for calculating a system-level address map with the user interactively changing one or more configuration parameters in accordance with the various aspects and embodiments of the invention. At step 202, a system description including initial configuration parameters is received. Step 202 may be the same or similar to step 102. At step 204 a tree representation of the system is created using interconnect information where the initiator is the root node, a target is a child node, and each port is a tree node containing a data model. Step 204 may be the same or similar to step 104.

At step 206, traversal of the tree is started from the target node(s) in the tree representation, and the system-level address map is created. Step 206 may be the same or similar to step 106.

At step 208, a report is created based on the address map from the target(s) to the initiator. Step 208 may be the same or similar to step 108.

At step 212, a determination is made if further configuration changes are needed. For example, the user may be prompted if further configuration changes are needed, and the user may provide input to make the determination.

When further configuration changes are needed, step 216 is performed. At step 216, a user adjusts one or more configuration parameters and the tree representation of the system is updated to reflect the changes of the user. For example, the user may modify the address and/or transfer function for one or more system components, and the tree representation is updated. The results with the modified configuration are then presented as an additional report. This process may be used iteratively to create successive revisions to the address map, until the designer is satisfied no errors or defects are found.

When no configuration changes are needed, step 214 is performed. At step 214, the process is ended.

Figure 3:
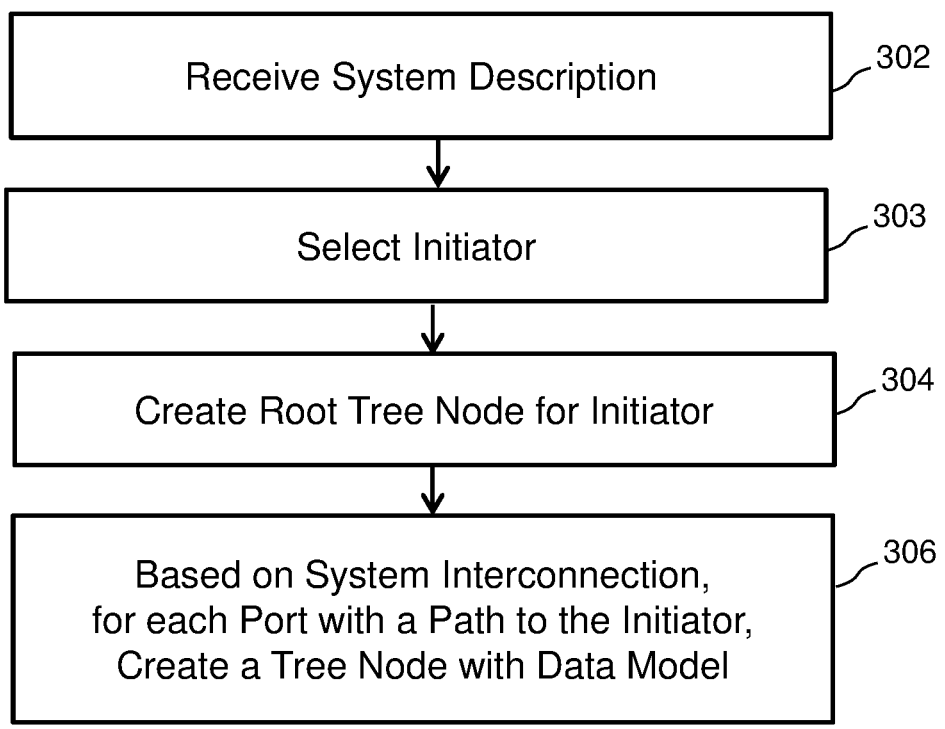
FIG. 3 shows a process for creating a tree representation of a system in accordance with the various aspects and embodiments of the invention.

Referring now to FIG. 3, a process is shown for creating a tree representation of a system in accordance with the various aspects and embodiments of the invention. The process of FIG. 3 is described as being executed for a single initiator, but may be reiterated for each initiator in the system to create a system-level tree representation.

At step 302, a system description is received that includes an initiator and one or more targets. Step 302 may be the same or similar to steps 102 and 202.

At step 303, an initiator within the system is selected.

At step 304, a root node for the tree representation is created corresponding to the initiator.

At step 306, connectivity information about the system and the paths interconnecting elements within the system are used to build a tree representation, and is stopped when all targets corresponding to the selected initiator are reached. According to one or more embodiments and aspects of the invention, starting from the root tree node for initiator, the child tree nodes are calculated based on the design connectivity information and any bridge/interconnect properties. Step 306 may proceed recursively, until the connection from the initiator (root node) to all targets (child nodes) are described.

According to one or more aspects and embodiments of the invention, when multiple paths to reach a target exist (e.g., aliasing), the target node is replicated in the tree for each occurrence of the target.

Figure 4:
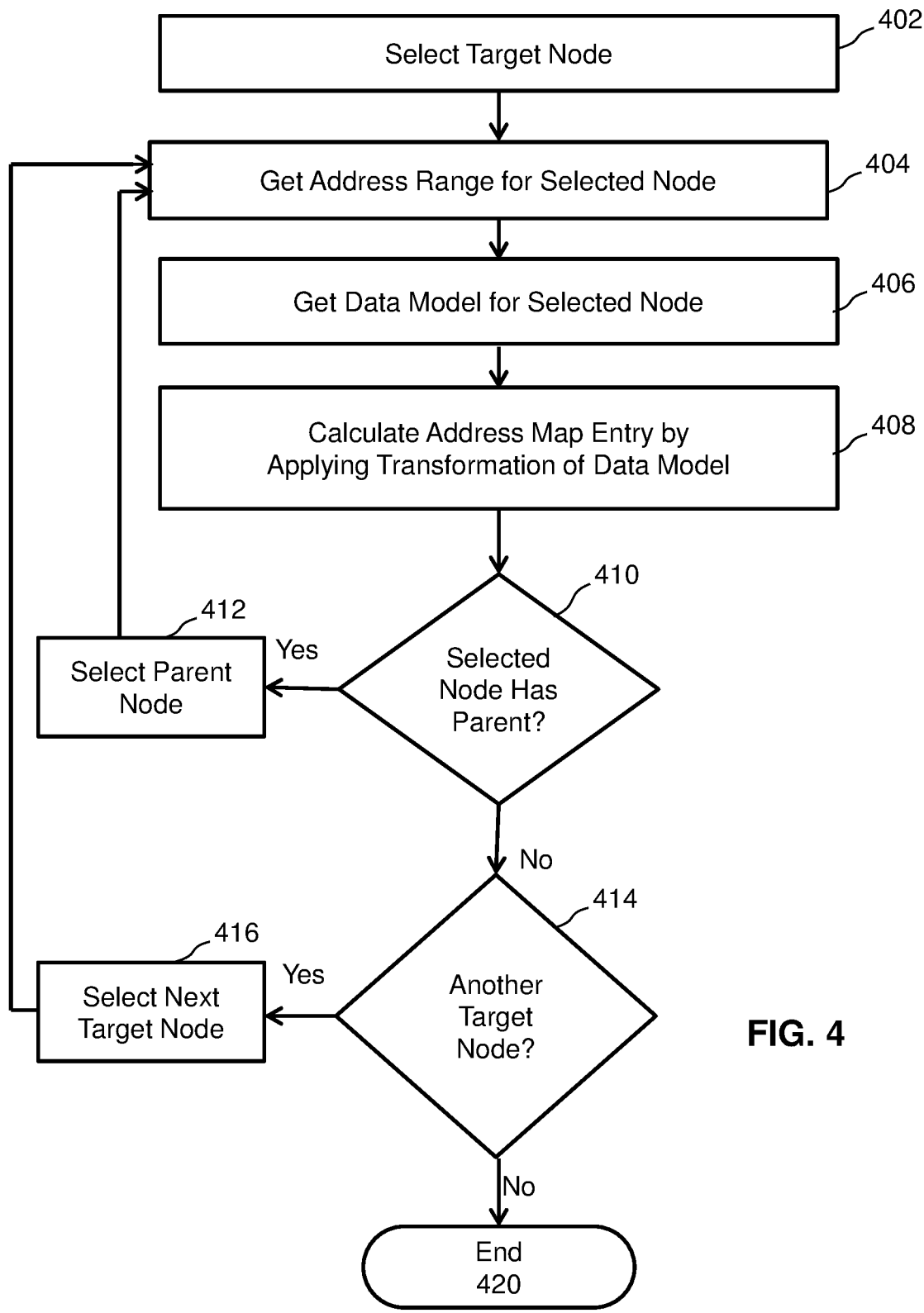
FIG. 4 shows an example of traversing a tree representation of a system in accordance with various aspects and embodiments of the invention.

Referring now to FIG. 4, a process is shown for traversing a tree representation of a system in accordance with the various aspects and embodiments of the invention. The tree is assumed to have an initiator as the root node, and a number of target nodes associated to the initiator that are connected by various paths to the root node through components such as bridges, interconnects, etc. Such a process for traversing a tree may be used in the above-described steps 106 and 206 for generating system-level address maps. As described above, this process can be repeated when designs with multiple initiators are being analyzed.

At step 402, a target node within the tree representation is selected.

At step 404, the address range of the target node is retrieved.

At step 406, the data model of the selected node is retrieved.

At step 408, an address map entry is calculated for the selected node by applying the transformation of the data model to the address range of the target. Each address map entry may be added to the system-level address map as the tree is being traversed, or all address map entries may be combined to create the system-level address map after traversing the tree is complete. According to one or more aspects and embodiments of the invention, a transfer function may be applied to the address range to obtain the address map entry as the transfer function includes the correct transformation to apply.

At step 410 a determination is made if the selected node has a parent node. When the selected node has a parent node, step 412 is performed.

At step 412, the parent node of the selected node is selected, and step 406 is performed for the now-selected parent node. The process is then repeated recursively throughout the tree, with an address map entry generated for each successive parent node that is identified.

When the selected node does not have a parent node, in step 414, a determination is made whether there are additional target nodes within the tree representation.

If there are additional target nodes, in step 416, one of the remaining target nodes is selected, and the process repeats from step 404 through 414.

If there are no additional target nodes, the process is ended with step 420.

According to one or more aspects and embodiments of the invention, traversing the tree representation may be ended when the initiator (root node) is reached for all targets. According to one or more aspects and embodiments of the invention, traversing the tree representation includes for each target unique address range going backwards on the tree, applying all the transfer function found along the way recursively until arrival to the initiator.

Figure 5:
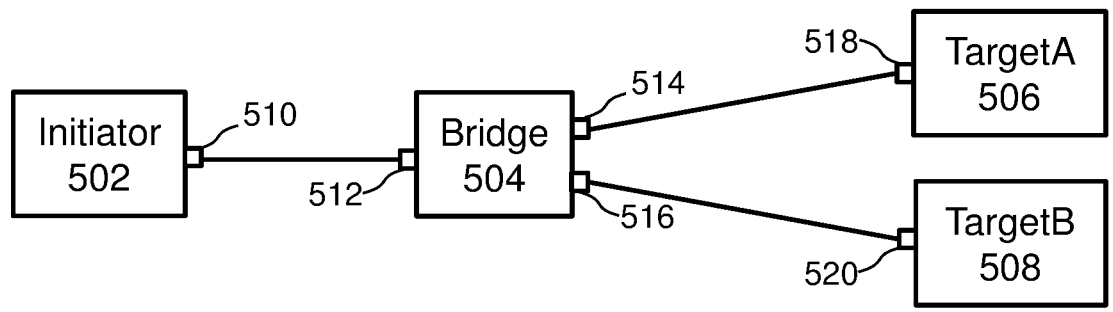
FIG. 5 shows an example of a system in accordance with various aspects and embodiments of the invention.
Figure 6:
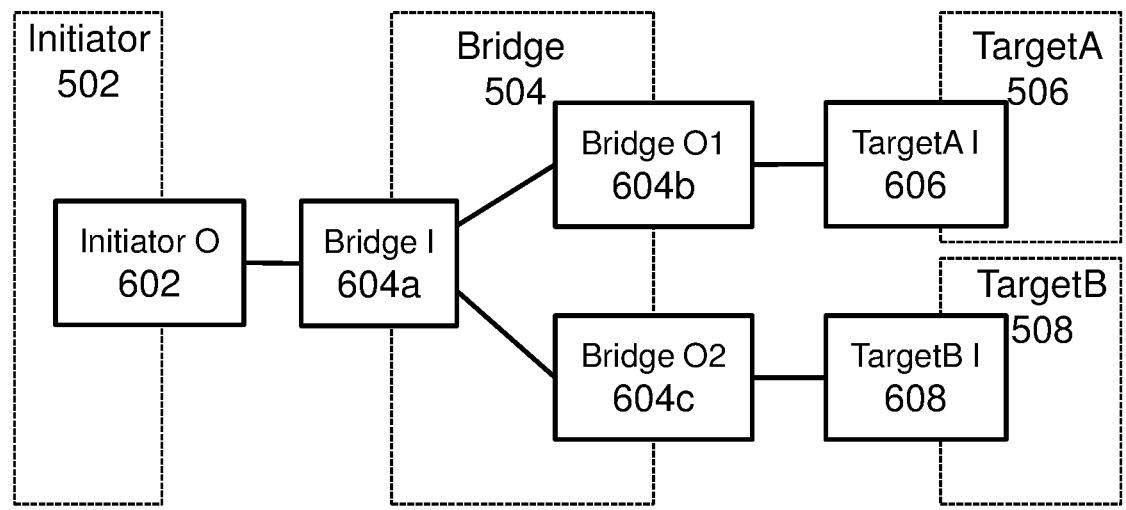
FIG. 6 shows a tree representation of the system of FIG. 5 in accordance with various aspects and embodiments of the invention.

Referring now to FIGS. 5 and 6, an example system (FIG. 5) and the corresponding tree representation (FIG. 6) is shown.

Referring to FIG. 5, initiator 502 has output port 510 connected to the input port 512 of bridge 504. Bridge 504 has output port 514 connected to input port 518 of targetA 506, and output port 516 connected to input port 520 of targetB 508.

Referring to FIG. 6, creation of the tree representation for the system of FIG. 5 begins with creating initiator O node 602, which corresponds with the output port 510 of initiator 502. Bridge I node 604a is created to correspond to input port 512 of bridge 504, and is connected to initiator O node 602. Bridge O1 node 604b is created to correspond to the output port 514 of bridge 504 and is connected to bridge I node 604a. Bridge O2 node 604c is created to correspond to the output port 516 of bridge 504 and is also connected to bridge I node 604a. TargetA I node 606 is created to correspond to input port 518 of targetA 506 and connected to bridge O1 node 604b. TargetB I node 608 is created corresponding to input port 520 of target 508 and connected to bridge O2 node 604c. When a node is created, an associated data model is created for each node.

Figure 7:
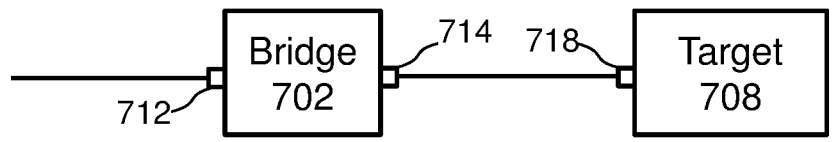
FIG. 7 shows an example of a portion of a system in accordance with various aspects and embodiments of the invention.
Figure 8:
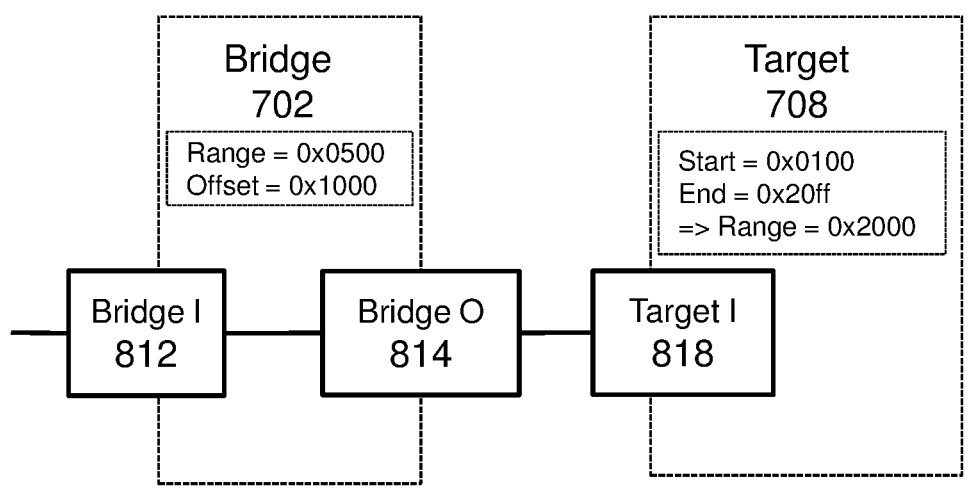
FIG. 8 shows a tree representation of the system of FIG. 7 in accordance with various aspects and embodiments of the invention.

Referring now to FIGS. 7 and 8, a portion of a system is shown in FIG. 7, and its corresponding tree representation is shown in FIG. 8 in accordance with various aspects and embodiments of the invention. As noted with respect to FIG. 5, the various aspects and embodiments of the invention may use a design described using IP-XACT standards, such as the non-limiting example of cells ports connected together with connections.

In FIG. 7, a single bridge 702 has an input port 712 and output port 714, which is in turn connected to the input port 718 of target 708.

FIG. 8 shows the corresponding tree representation, with Bridge I node 812 corresponding to the input port 712 of bridge 702, which is connected to Bridge O node 814, corresponding to output port 714 of bridge 702, which in turn is connected to Target I node 818 corresponding to the input port 718 of target 708.

Then the various aspects of the invention use computations with 2 steps:
  1) the tree structure, such as those shown in FIGS. 6 and 8, is built starting from the initiator downwards, as described with respect to the steps of FIG. 3; and
  2) an address map entry is calculated starting from the target upwards, as described in the steps of FIG. 4.

As an example, consider bridge O node 814 as connected to target I node 818 using the following limitations and transformations on memory addresses.

Representations of memory addresses may be expressed in hexadecimal notation, denoted here using the prefix "0x".

For this example, bridge 702 has a transformation that uses 2 elementary transfer functions:
  a) clipping between addresses 0x0000 and 0x5ff; and
  b) a shift by an offset of 0x1000.
while, for this example, assume target 708 has an address ranging from 0x100 to 0x20ff, and therefore a range of 0x2000.

To calculate the system-level address map, the original address range of target 708 is 0x0100 to 0x20ff. As target 708 performs no operations on the addresses, the computed system-level address range is 0x0100 to 0x20ff, which is the same as the original address range.

Bridge 702 performs two element transfer functions. First, bridge 702 performs a clipping with a range of 0x0500, so with a base address of 0x0100, computed address range 0x0100 to 0x05ff, with addresses from 0x0600 to 0x20ff being masked. Then, bridge 702 performs an offset by 0x1000, so that the computed address range is 0x1100 to 0x15ff. So in this example, address 0x0100 in the target is mapped to 0x1100 by the bridge, address 0x0200 is mapped to 0x1200 by the bridge, etc., and address 0x2000 in the target will be clipped by the bridge and cannot be reached.

This analysis is represented below in Table I.

TABLE 1

Example of data for a report for the simple example illustrated in FIG. 7 and FIG. 8.

| Component | Interface | Transformation | Original Address Range | | Computed Address Range | |
| --- | --- | --- | --- | --- | --- | --- |
| | | | Start Address | End Address | Start Address | End Address |
| Target | 1 | None | 0x0100 | 0x20ff | 0x0100 | 0x20ff |
| Bridge | 0 | Clipping | 0x0100 | 0x05ff | 0x0100 | 0x05ff |
| Bridge | 1 | Offset | 0x0100 | 0x05ff | 0x1100 | 0x15ff |

According to one or more aspects and embodiments of the invention, the original address range is the target address range in the target component and the computed address range is the target address range in the Initiator, bridge, interconnect, or other network component.

By executing the two processes of: a) generating a tree diagram that describes the interdependencies of memory addresses for each connection between initiators and targets, and then, starting with the targets and traversing backwards through the tree; and b) creating a system-level address map that describes the impact of memory transformations for each connection in sequence, defects and errors in the electronic system design can be rapidly detected and made apparent to the designer.

From analysis of this address map, defects such as address duplication, missing addresses, etc. can be identified and reported to the user. Once identified, the user can then edit or change the configurations of the various elements in the elements of the design, and repeat the traverse of the tree to generate a revised address map, and determine if the problem has been addressed.

Figure 9:
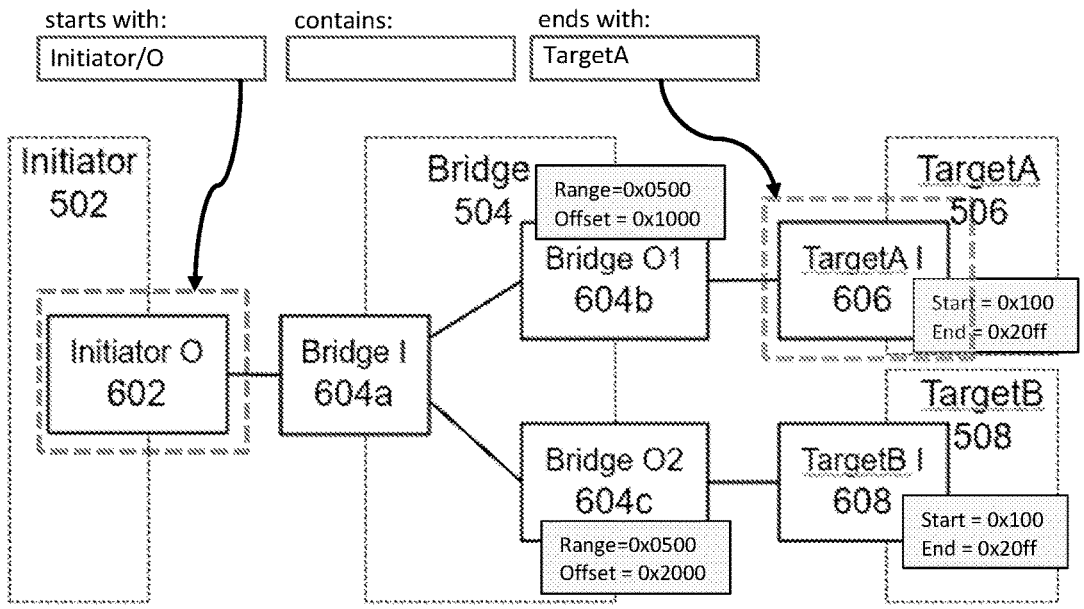
FIG. 9 illustrates system-level address map filtering and interacting with schematic in accordance with various aspects and embodiments of the invention

Referring now to FIG. 9, a schematic is shown for selection filtering and the associated report for selected paths, for example of FIG. 6, in accordance with the various aspects and embodiments of the invention. Path selection is done either by typing the source (starts with) and/or intermediate elements (contains) and/or target (ends with) names or by selecting bus interfaces graphically in the schematic. In accordance with some aspects and embodiments of the invention, FIG. 9 may be split to separate filtering and interaction within the report by clicking on a schematic element, for example such as initiator 602. In accordance with some aspects and embodiments of the invention, path selection is done by typing the source (entry filed "starts with"), intermediate elements (entry filed "contains"), and/or target (entry filed "ends with") names; there can be one, any combination of, or all of these inputs. In accordance with some aspects and embodiments of the invention, element names could also be selected from a drop-down list filled with the accessible elements.

According to one or more aspects and embodiments of the invention, the tree representation is stored in the memory (e.g., RAM) of the computer analyzing the addresses of the system. According to one or more aspects and embodiments of the invention, the representation is stored on the storage (e.g., hard drive, network drive, etc.) of the computer analyzing the addresses of the system. According to one or more aspects and embodiments of the invention, the tree representation is stored in a combination of memory (e.g., RAM) and storage (e.g., hard drive, network drive, etc.) of the computer analyzing the addresses of the system. According to one or more aspects and embodiments of the invention, the addressing analysis may be performed on a server and the results sent to the computer performing the address analysis.

Figure 10:
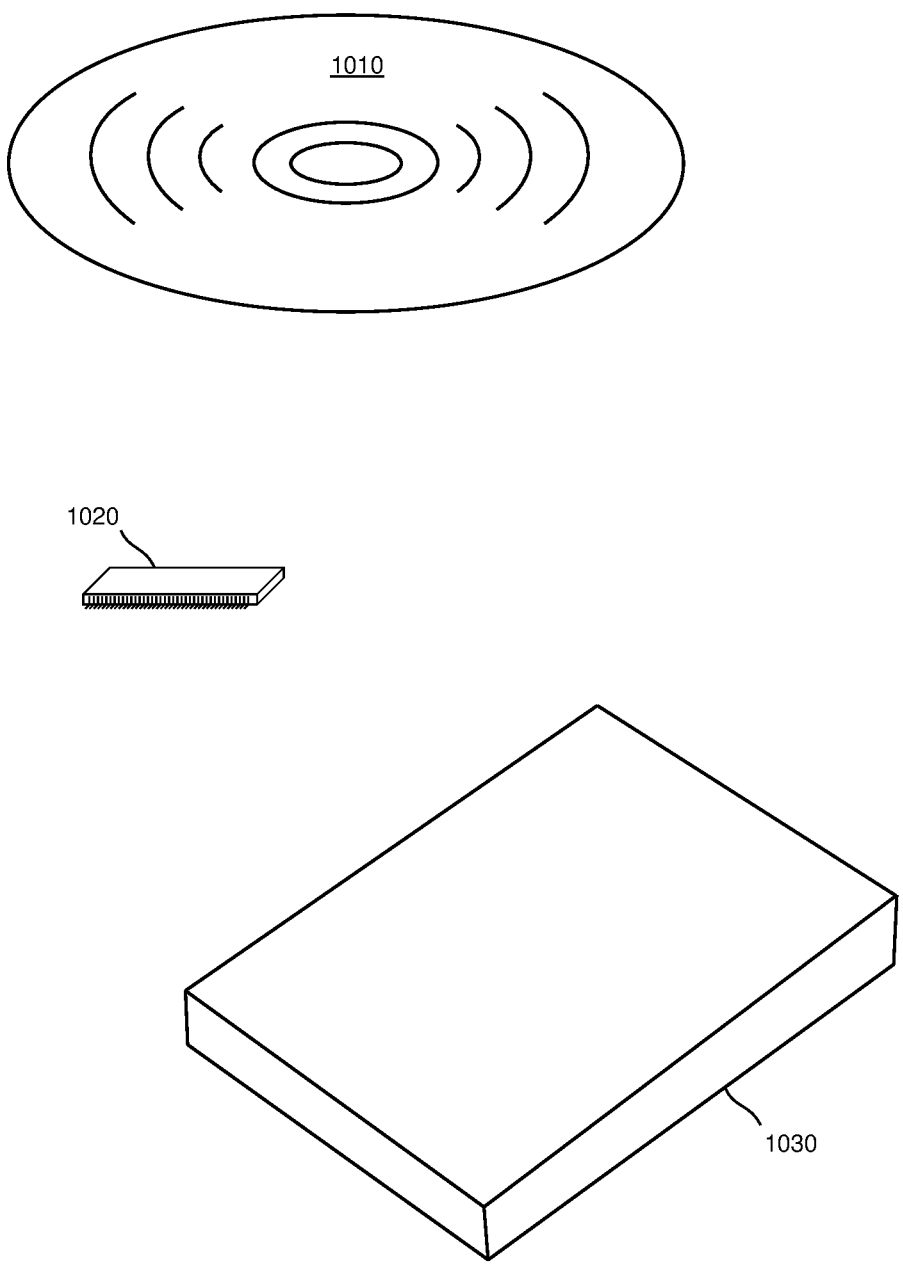
FIG. 10 illustrates various embodiment of non-transitory computer readable medium in accordance with the various aspects of the invention.

Referring now to FIG. 10, an optical CD 1010, a memory chip 1020, and an optical drive 1030 are shown in accordance with the various embodiments of the invention for storing information related to participants and users and code, which when executed cause the system to perform methods. Examples of the memory chip 1020 include solid-state storage (SSS), solid state drive (SSD), solid state card (SSC), solid state module (SSM) and flash drives. Other examples on a storage medium include magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like. Some examples of computer-readable storage medium may include random access memory (RAM), dynamic random access memory (DRAM), static random access memory (SRAM), fast page mode dynamic random access memory (FPM DRAM), synchronous dynamic random access memory (SDRAM), double data rate synchronous dynamic random access memory (DDR SDRAM), extended data-out dynamic random access memory (EDO DRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. Embodiments are described that use a computer-readable storage medium, other types of computer-readable storage media may be substituted for or used in addition to the computer-readable storage media described herein. Some examples or embodiments are non-transitory computer readable media arranged to store such instructions for methods described herein. Whatever machine holds non-transitory computer readable medium comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Various examples are methods that use the behavior of either or a combination of machines. Method examples are complete wherever in the world most constituent steps occur. For example, and in accordance with the various aspects and embodiments of the invention, Intellectual Property (IP) elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

With this Application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. A method for analyzing an electronic system design, comprising:
    receiving a representation of an electronic system design, wherein the design includes a plurality of components, which includes initiators and targets;
    generating a tree representation of the electronic system design, wherein ports in the electronic system design are represented in the tree as tree nodes and the tree nodes have a data model;
    selecting an initiator component from the design;
    identifying target components associated with the initiator;
    generating, starting with one of the identified target components, an address map of the electronic system; and
    generating a report based on the address map.

2. The method of claim 1, wherein the electronic system design corresponds to a design comprising one or more integrated circuits, and comprises one or more components selected from the group consisting of central processing units (CPUs), graphical processing units (GPUs), bridges, interconnects, and targets and the representation includes configuration parameters for the plurality of components.

3. The method of claim 2, wherein the electronic system design uses a format related to IEEE standard 1685-2009 (IP XACT).

4. The method of claim 2, wherein the tree representation includes, for each component:
    a node corresponding to each input and output port for the component;
    one or more data models corresponding to the component; and
    connectivity information relating the nodes of different components.

5. The method of claim 4, wherein the data models represent transfer functions for the component.

6. The method of claim 5, wherein the transfer functions include an operation identifier and an operation property.

7. The method of claim 4, wherein the data models represent address ranges for the component.

8. The method of claim 2, wherein the address map is generated by traversing the tree representation from each identified target component to a corresponding initiator.

9. The method of claim 2, wherein the address map describes, for each identified target component, operations affecting target memory addresses arising from all system components on a path connecting an identified target component to the selected initiator.

10. The method of claim 2 further comprising:
    modifying, after the generation of the report, one or more configuration parameters for components of the system;
    generating a revision to the address map, calculated using the modified configuration parameters; and
    generating an additional report based on the revision to the address map.

11. The method of claim 1, wherein the report includes information regarding memory addresses in each identified target component and calculates any memory ranges in the identified target components not accessible to a corresponding initiator.

12. The method of claim 1, wherein the report comprises information regarding a memory address in the selected initiator identified as addressing more than one location in the identified target components.

13. The method of claim 12 further comprising displaying the information from the report on a display visible to a user.

14. The method of claim 1, wherein the report comprises information regarding two memory addresses in the selected initiator identified as addressing the same location in the identified target components.

15. The method of claim 1 further comprising displaying information from the report on a display visible to a user.

16. The method of claim 15, wherein the display visible to a user also displays schematic information about the electronic system design.

17. The method of claim 15 further comprising:
    receiving input from a user selecting a subset of the identified target components, and
    displaying only information from the report regarding the selected subset of targets to a user.

18. A system comprising:
    a memory for storing code; and
    a processor in communication with the memory, wherein the processor executes code that causes the system to:
        receive a representation of an electronic system design, wherein the design includes a plurality of components;
        generate a tree representation of the electronic system design, wherein ports in the electronic system design are represented in the tree as tree nodes and the tree nodes have a data model;
        select an initiator component from the design;
        identify target components associated to the initiator;
        generate, for each identified target component, an address map of the electronic system; and
        generate a report from the address map.

19. The system of claim 18, wherein the tree representation and the address map are also in stored in the memory for storing code.

20. A non-transitory computer readable medium comprising code that, when executed by at least one computer processor comprised by a system would cause the system to:
    receive a representation of an electronic system design, wherein the design includes at least initiators and targets;
    generate a tree representation of the electronic system design, wherein ports in the electronic system design are represented in the tree as tree nodes and the tree nodes have a data model;
    select an initiator component from the design;
    identify at least one initiator;
    generate, for each identified initiator an address map of the electronic system; and
    generate a report from the address map.

* * * * *